United States Patent

Camarota

[11] Patent Number: 5,934,792
[45] Date of Patent: Aug. 10, 1999

[54] FLEXIBLE LIGHTING SYSTEM

[75] Inventor: Richard J. Camarota, Holland, Mich.

[73] Assignee: ITC, Inc., Holland, Mich.

[21] Appl. No.: 08/805,046

[22] Filed: Feb. 24, 1997

[51] Int. Cl.$^6$ .................................................. F21V 21/00
[52] U.S. Cl. .......................... 362/249; 362/240; 362/246
[58] Field of Search .................................. 362/249, 246, 362/240, 226, 62, 470; 439/682, 683, 686, 692, 695, 668–9; 445/22

[56] References Cited

U.S. PATENT DOCUMENTS

| Re. 32,899 | 4/1989 | Laidman | 326/226 |
|---|---|---|---|
| 2,644,113 | 5/1953 | Etzkorn | 445/22 |
| 2,652,549 | 9/1953 | Ingalls et al. | 439/695 |
| 3,755,663 | 8/1973 | George, Jr. | 240/10 R |
| 4,107,767 | 8/1978 | Anquetin | 362/236 |
| 4,177,503 | 12/1979 | Anquetin | 362/236 |
| 4,271,458 | 6/1981 | George, Jr. | 362/236 |
| 4,376,966 | 3/1983 | Tieszen | 362/249 |
| 4,600,975 | 7/1986 | Roberts | 362/145 |
| 4,607,317 | 8/1986 | Lin | 362/249 |
| 4,654,765 | 3/1987 | Laidman | 362/226 |
| 4,665,470 | 5/1987 | George, Jr. | 362/236 |
| 4,711,044 | 12/1987 | Danjell | 40/543 |
| 4,812,956 | 3/1989 | Chen | 362/249 |
| 4,845,601 | 7/1989 | Podbury et al. | 362/125 |
| 4,908,743 | 3/1990 | Miller | 362/238 |
| 5,388,035 | 2/1995 | Bodem, Jr. | 362/61 |
| 5,410,458 | 4/1995 | Bell | 362/219 |
| 5,438,804 | 8/1995 | Reum et al. | 52/102 |
| 5,499,170 | 3/1996 | Gagne | 362/84 |

Primary Examiner—Stephen Husar
Attorney, Agent, or Firm—Benita J. Rohm; Raphael A. Monsanto; Richard A. Gaffin

[57] ABSTRACT

A flexible lighting system and method of making same is disclosed. The flexible lighting system includes a flexible translucent rod and an attachment flange. Preferably, the outer casing and the attachment flange are integrally formed to facilitate installation. The flexible translucent rod includes an outer casing and a lighting core. The lighting core is disposed within an axial aperture defined by the outer casing and contains a series of lighting elements. In the preferred embodiment, a texture, such as axial grooves, is applied to a surface of the flexible translucent rod. This texture may be applied to the outer surface of the lighting core or the inner surface of the outer casing to diffuse the light emitted by the discrete lighting elements, thereby providing an appearance similar to a solid bar of light.

11 Claims, 2 Drawing Sheets

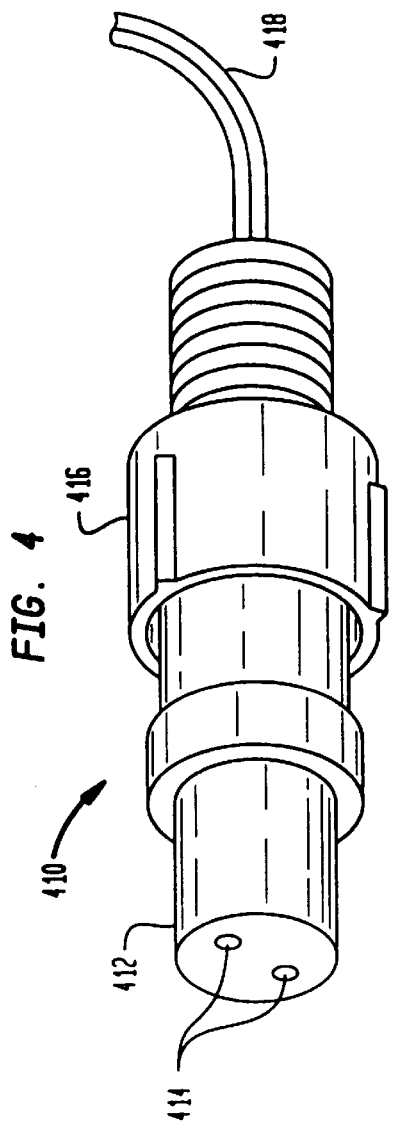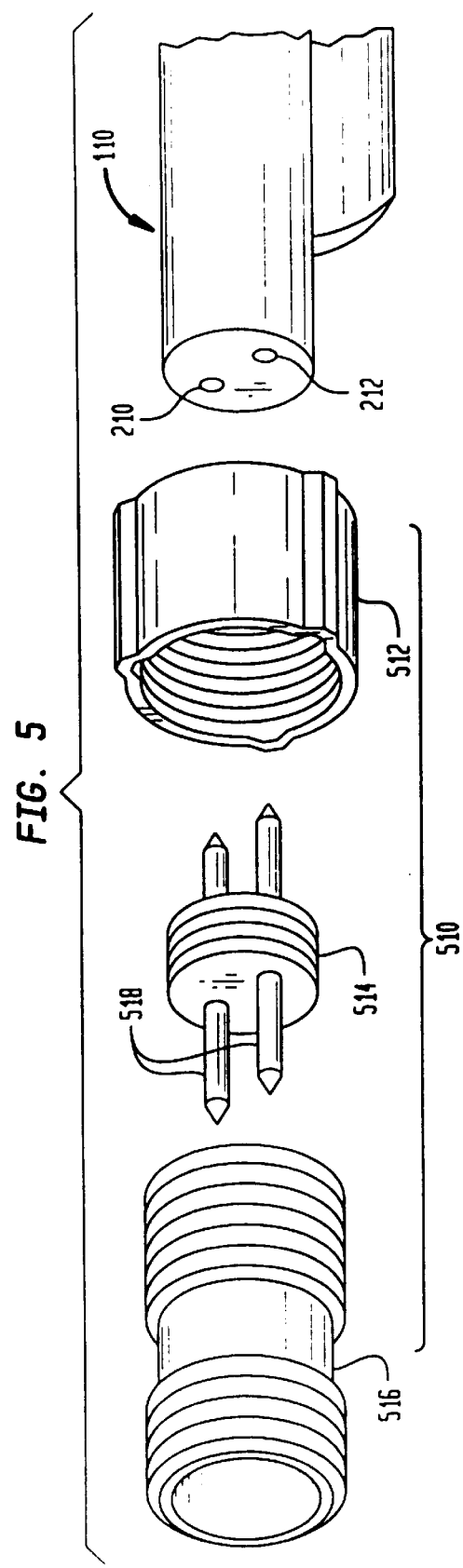

FLEXIBLE LIGHTING SYSTEM

BACKGROUND OF THE INVENTION

1. Field of the Invention

The present invention relates generally to flexible lighting systems, and more specifically, to a flexible lighting system which may be bent and folded to accommodate a variety of surfaces and which may be more efficiently installed than prior art flexible lights.

2. Description of the Related Art

Flexible lighting strips or rods have been known for many years. Typical applications for such flexible lighting include: interior and exterior trim for recreational vehicles, trim for boats, showcase and display lighting and aircraft emergency pathway illumination.

One typical flexible lighting strip, disclosed by Anquentin in U.S. Pat. No. 4,107,767, is comprised of an elongated section of transluscent plastic material having a portion formed as a cylindrical duct which houses a chain of electric lamps. At one end of the cylindrical duct, a pair of conductors is exposed for energizing the electric lamps. The cylindrical duct is filled with a translucent polymerizable compound which fixes the relative position of the chain of electric lamps within the cylindrical duct. Such a flexible lighting strip is preferably mounted to a support, such as a showcase, using double-sided adhesive tape.

A typical flexible lighting rod, disclosed by Lin in U.S. Pat. No. 4,607,317, consists of a molded or extruded, bendable and foldable bulb-holding bar body made of polyvinyl-chloride ("PVC") or similar plastic, two conducting wires and a plurality of conductive plugs connected with a plurality of small bulbs spaced with suitable pitch in series. The foremost and terminal bulbs of each set of bulbs are connected to the two conducting wires. This flexible lighting rod is typically mounted to a support using brackets or similar fasteners.

Notwithstanding the aforementioned known flexible lighting strips and rods, there is a need for an improved flexible lighting system. Specifically, there is a need for a flexible lighting system that provides greater efficiency, flexibility and precision in mounting. An improved mounting alternative facilitates installation and promotes use of the improved flexible lighting system. There is also a need for a method of making a flexible lighting system that not only facilitates installation but also provides a light source that is distributed throughout the length of a lighting rod, thereby reducing the segmented appearance of the discrete lighting elements and providing more of an appearance of a solid bar of light.

SUMMARY OF THE INVENTION

Objects of the Invention

It is an object of the present invention to provide a flexible lighting system that provides improved efficiency, flexibility and precision of installation over the prior art.

It is another object of the present invention to provide a method of manufacturing a flexible lighting system that produces a flexible lighting system providing more efficient, flexible and precise installation than the prior art.

It is a further object of the present invention to provide a method of manufacturing a flexible lighting system that produces a flexible lighting system that provides a light source that distributes light throughout the length of a lighting rod.

Summary of the Invention

In carrying out the foregoing and other objects of the present invention, a flexible lighting system is provided including a flexible translucent rod and an attachment flange. The flexible translucent rod includes an outer casing and an inner lighting core. The inner lighting core contains a plurality of lighting elements. The attachment flange is axially connected to the outer casing of the flexible translucent rod and facilitates efficient, flexible and precise installation of the flexible lighting system. Preferably, the flexible translucent rod and the attachment flange of the flexible lighting system are integrally formed.

In the preferred embodiment of the disclosed flexible lighting system, the light emitted from the lighting elements is distributed throughout the length of the lighting rod. This can be accomplished, using a textured surface, such as a surface employing axial grooves along the length of the flexible lighting rod.

In further carrying out the above objects and other objects of the present invention, a method of making a flexible lighting system is disclosed comprising the steps of extruding an inner lighting core and extruding an outer casing for the inner lighting core. The inner lighting core is formed of flexible translucent material and contains a series of lighting elements. The outer casing is also formed of flexible translucent material and includes an attachment flange to facilitate installation. Preferably, a texture is applied to a surface of the flexible lighting system to diffuse light emitted by the series of lighting elements. The texture, such as axial grooves, may be applied to either the outer surface of the inner lighting core or the inner surface of the outer casing.

It is an advantage of the present invention to provide efficient installation of the flexible lighting rod. This advantage is possible because the attachment flange can easily be mounted using common fasteners such as tacks, staples, nails and screws.

A further advantage of the present invention is the appearance of a solid bar of light. This results in a more attractive appearance as well as a more even distribution of light on an illuminated subject.

The objects, features and advantages of the present invention are readily apparent from the following description of the preferred embodiments when taken in connection with the accompanying drawings.

BRIEF DESCRIPTION OF THE DRAWINGS

Comprehension of the invention is facilitated by reading the following detailed description, in conjunction with the annexed drawings, in which:

FIG. 4 is a perspective view of the power connector for the flexible lighting system; and FIG. 5 is an exploded perspective view of the power source receptor for the flexible lighting system.

DETAILED DESCRIPTION

Figure 1:
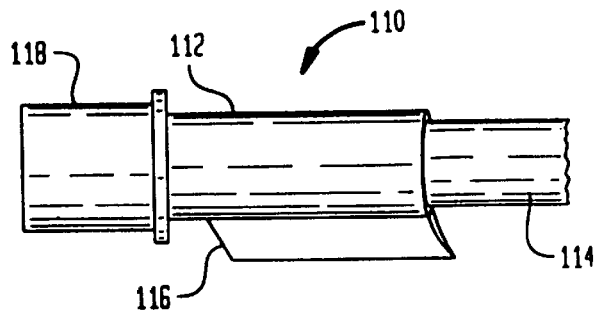
FIG. 1 is a partial longitudinal sectional view of this invention.

Referring now to the drawing figures, FIG. 1 shows a partial longitudinal sectional view of a flexible lighting system 110 in accordance with the present invention. System 110 includes an outer casing 112, an inner lighting core 114 disposed within outer casing 112, an attachment flange 116 attached to the outer casing 112 and an end cap 118 for terminating an end of flexible lighting system 110.

Outer casing 112 consists of an extruded flexible translucent material such as PVC or similar plastic. The appropriate diameter and thickness of outer casing 112 depends upon the intended use of the flexible lighting system. Typical applications call for outer casing diameters of ½ inch or ⅜ inch. Attachment flange 116 is integrally formed of outer casing 112 allowing outer casing 112 to not only cover and protect lighting core 114, but also facilitate easy installation. Installation of flexible lighting system 110 can be accomplished using standard fasteners including staples, tacks, nails and screws among others. The ability to use standard fasteners during installation is a significant advantage over the prior art for at least two reasons: First, because the flexible lighting system of the present invention is typically used in applications such as recreational vehicle trim, boat trim and showcase display unit lighting, the flexible lighting rods must often be installed in positions and along surfaces which make installation difficult. Second, the flexible lighting system of the present invention is typically installed by unskilled laborers and hobbyists.

Like outer casing 112, inner lighting core 114 consists of an extruded flexible translucent material such as PVC or similar plastic. As shown in FIG. 1, inner lighting core 114 includes an outer surface having a texture of axial grooves. This or another texture can be applied during the extrusion process.

Figure 2:
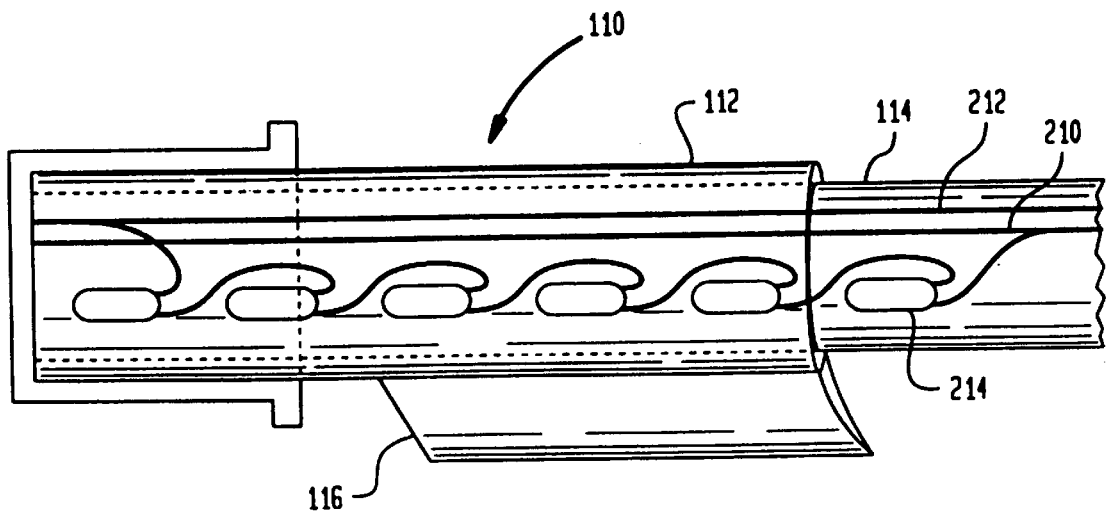
FIG. 2 is a longitudinal sectional view of this invention.

Referring now to FIG. 2, inner lighting core 114 includes two substantially parallel electrical conductors of suitable grade 210 and 212 which span the portion of the flexible lighting system that is to be illuminated. Inner lighting core 114 further includes a number of electrical light bulbs 214 connected to electrical conductors 210 and 212. Although the electrical light bulbs of FIG. 2 are shown connected to electrical conductors 210 and 212 in series, the could easily be connected in another fashion, such as in parallel. In fact, the two methods of connecting the electrical light bulbs 214 could be combined to provide a flexible lighting system which may be cut to lengths based on the intended application of the flexible lighting system. In such an embodiment, sequential sets of electrical light bulbs 214 may be interconnected in light bulb group that span, for example 18 inches. Such interconnection may be in series so that the translucent core and inner lighting rod of the flexible lighting system may be cut at certain 18 inch intervals without destroying the electrical integrity of the flexible lighting system. The ability to cut the system to a desired length renders the flexible lighting system more versatility and provides the ability to apply the system to a larger variety of applications.

Figure 3:
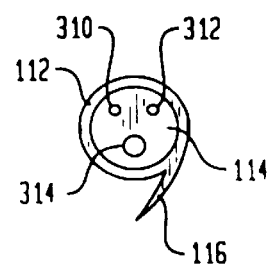
FIG. 3 is a transverse sectional view of the flexible lighting system in accordance with the invention.

Referring now to FIG. 3, there is shown a transverse sectional view of the flexible lighting system in accordance with the present invention. As shown, inner lighting core 114 is positioned within outer casing 112. Inner lighting core 114 includes apertures 310 and 312 for retaining electrical conductors 210 and 212, and aperture 314 for retaining electrical light bulbs 214.

Referring now to FIG. 4, there is shown a perspective view of the power connector 410 for the flexible lighting system. Power connector 410 includes female plug 412 having two receptacles 414 for receiving and conducting power to conductive pins 518 described with reference to FIG. 5. Power connector 410 further includes compression collar 416 to provide threaded attachment to barrel fitting 516 of power source receptor 510 described with reference to FIG. 5. Finally, power connector 410 includes power cord 418 having two conductors in electrical communication with receptacles 414.

Referring now to FIG. 5, there is shown power source receptor 510 for allowing flexible lighting system 110 to receiving electrical power. Power source receptor 510 includes compression collar 512, conductive insert 514 and barrel/compression fitting 516. Compression collar 512 is slipped onto the flexible lighting rod of flexible lighting system 110 with the threaded end disposed so as to receive the slotted end of barrel/compression fitting 516 and retain conductive insert 514. Conductive insert 514 is inserted into the end of the flexible lighting rod so that the sharp ends of conductive pins 518 provide electrical connection with electrical conductors 210 and 212.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A flexible lighting system comprising:
    a plurality of sets of electrically interconnected lighting elements, said sets being electrically coupled to one another;
    a flexible translucent rod containing said plurality of sets of electrically interconnected lighting elements, said rod having a circumference and an axis; and
    an attachment flange axially connected to said flexible translucent rod, said attachment flange being formed integrally with said flexible translucent rod and facilitating installation of said flexible translucent rod,
    whereby said flexible translucent rod and said integrally formed attachment flange can be cut in regions intermediate of respective ones of the sets of electrically interconnected lighting elements without affecting the electrical interconnection within any such sets of electrically interconnected lighting elements.

2. The flexible lighting system of claim 1, wherein said flexible translucent rod forms a generally cylindrical aperture for holding an inner lighting core, said inner lighting core having a textured outer surface for diffusing light emitted from the lighting elements.

3. The flexible lighting system of claim 2, wherein the textured outer surface comprises axial grooves.

4. The flexible lighting system of claim 1, wherein said flexible translucent rod forms a generally cylindrical aperture for holding an inner lighting core, said aperture being formed by an inner surface of said flexible translucent rod, the inner surface being textured for diffusing light emitted from the lighting elements.

5. The flexible lighting system of claim 4, wherein the textured inner surface comprises axial grooves.

6. The flexible lighting system of claim 1 further comprising:
    a power connector for providing electrical power to said system; and
    a power receptor for receiving electrical power from said power connector, said power receptor including a compression fitting positioned co-axially with said translucent rod and disposed at an end of said translucent rod;

a compression collar disposed around said translucent rod, and a conductive insert for mating said power receptor with said power connector, the conductive insert disposed between and retained by the compression fitting and the compression collar.

7. A method of making a flexible lighting system comprising the steps of:

extruding an inner lighting core, said inner lighting core formed of flexible translucent material and containing a plurality of lighting elements; and extruding an outer casing for said inner lighting core, said outer casing having inner and outer surfaces and including an attachment arrangement integrally formed therewith.

8. The method of claim 7 further comprising applying a texture to the outer surface of the inner lighting core to diffuse light emitted by the plurality of lighting elements.

9. The method of claim 8, wherein the applied texture of the outer surface of the inner lighting core comprises axial grooves.

10. The method of claim 7, further comprising applying a texture to the inner surface of the outer casing to diffuse light emitted by the plurality of lighting elements.

11. The method of claim 10, wherein the texture applied to the inner surface of the outer casing comprises axial grooves.

* * * * *